(12) United States Patent
Collins et al.

(10) Patent No.: US 8,574,523 B2
(45) Date of Patent: Nov. 5, 2013

(54) ADVANCED DRY HEAD-END REPROCESSING OF LIGHT WATER REACTOR SPENT NUCLEAR FUEL

(75) Inventors: Emory D. Collins, Knoxville, TN (US); Guillermo D. Delcul, Powell, TN (US); Rodney D. Hunt, Harriman, TN (US); Jared A. Johnson, Knoxville, TN (US); Barry B. Spencer, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/079,897

(22) Filed: Apr. 5, 2011

(65) Prior Publication Data

US 2011/0250108 A1   Oct. 13, 2011

Related U.S. Application Data

(60) Provisional application No. 61/322,472, filed on Apr. 9, 2010.

(51) Int. Cl.
*C01F 13/00* (2006.01)
*C01F 15/00* (2006.01)
*C01G 43/00* (2006.01)
*C01G 56/00* (2006.01)

(52) U.S. Cl.
USPC ............ 423/249; 423/385; 423/253; 423/18; 423/11; 423/405; 210/758

(58) Field of Classification Search
USPC .............. 423/249, 648, 253, 11, 18; 210/758
See application file for complete search history.

(56) References Cited

U.S. PATENT DOCUMENTS

| 4,279,875 A | * | 7/1981 | Bray et al. | 423/249 |
| 6,033,636 A | * | 3/2000 | Todokoro et al. | 423/18 |
| 6,156,183 A | * | 12/2000 | Kondo et al. | 205/47 |

FOREIGN PATENT DOCUMENTS

| JP | 02054732 A | * | 2/1990 |
| JP | 2000266891 A | * | 9/2000 |

OTHER PUBLICATIONS

V.V. Bondin et al., Conversion of Uranium Dioxide and Real Spent Nuclear Fuel Into Nitrates; ISSN 1066-3622 Radiochemistry 2008, vol. 50, No. 3 pp. 253-255.
V.V. Bondin et al., Conversion of Actinide and RE Oxides into Nitrates and Their Recovery into Fluids; Global 2007, Boise, Idaho, Sep. 13, 2007 (7 pages).

* cited by examiner

*Primary Examiner* — Melvin C Mayes
*Assistant Examiner* — Melissa Stalder
(74) *Attorney, Agent, or Firm* — Novak Druce Connolly Bove + Quigg LLP

(57) ABSTRACT

A method for reprocessing spent nuclear fuel from a light water reactor includes the step of reacting spent nuclear fuel in a voloxidation vessel with an oxidizing gas having nitrogen dioxide and oxygen for a period sufficient to generate a solid oxidation product of the spent nuclear fuel. The reacting step includes the step of reacting, in a first zone of the voloxidation vessel, spent nuclear fuel with the oxidizing gas at a temperature ranging from 200-450° C. to form an oxidized reaction product, and regenerating nitrogen dioxide, in a second zone of the voloxidation vessel, by reacting oxidizing gas comprising nitrogen monoxide and oxygen at a temperature ranging from 0-80° C. The first zone and the second zone can be separate. A voloxidation system is also disclosed.

15 Claims, 1 Drawing Sheet

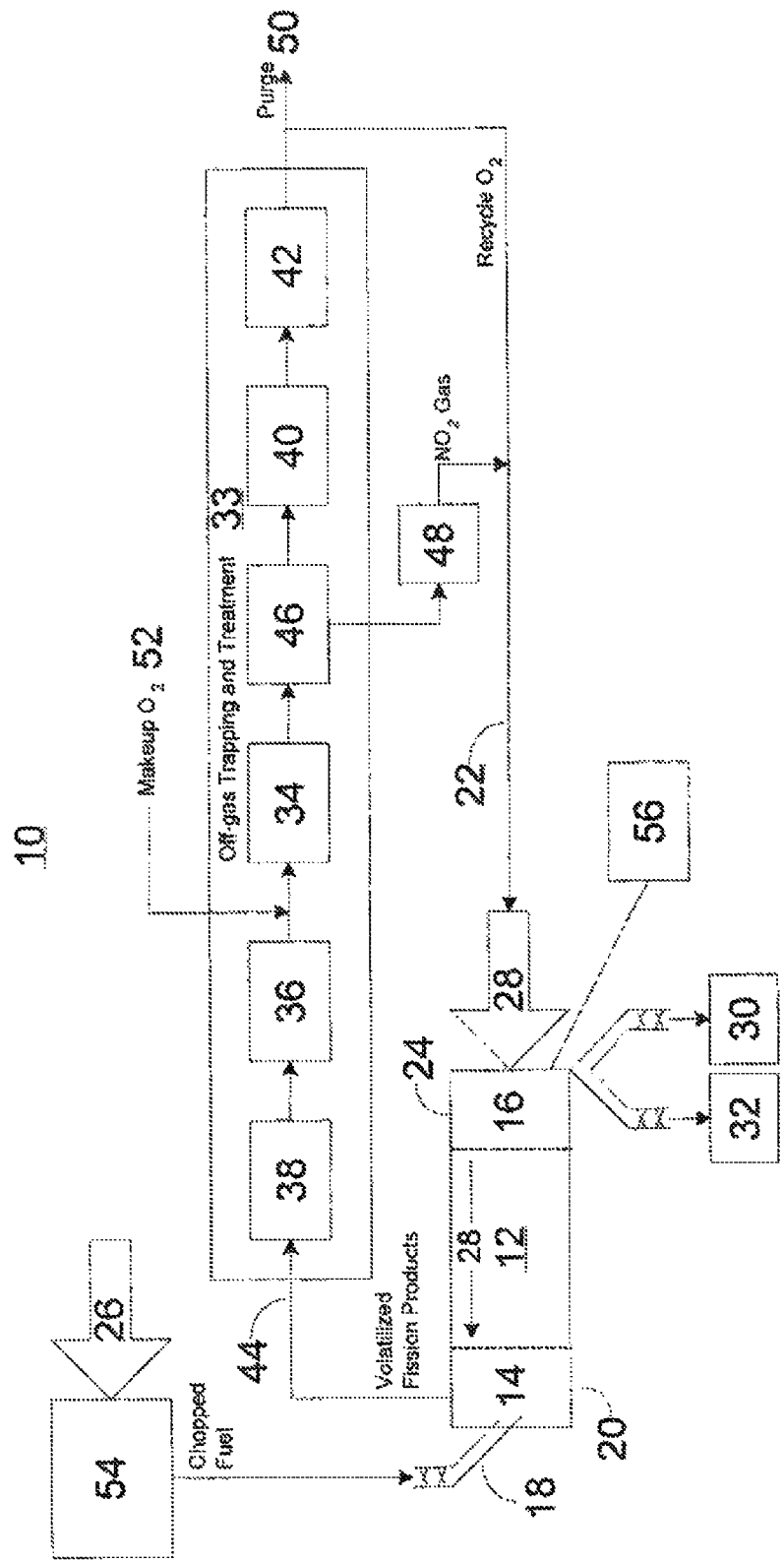

ADVANCED DRY HEAD-END REPROCESSING OF LIGHT WATER REACTOR SPENT NUCLEAR FUEL

CROSS REFERENCE TO RELATED APPLICATIONS

This application claims priority to U.S. Provisional Patent Application No. 61/322,472, entitled "Advanced Dry Head-End Reprocessing of Light Water Reactor Spent Nuclear Fuel," filed Apr. 9, 2010, the entirety of which is incorporated herein by reference.

STATEMENT REGARDING FEDERALLY SPONSORED RESEARCH OR DEVELOPMENT

This invention was made with government support under DE-AC05-000R22725 awarded by the United States Department of Energy. The Government has certain rights in the invention.

FIELD OF THE INVENTION

The present invention relates to reprocessing of spent nuclear fuel from light water nuclear reactors.

BACKGROUND OF THE INVENTION

Treatment, storage and reprocessing of waste from nuclear power plants are substantial concerns associated with nuclear power plants. The present state of the art for dry head-end reprocessing of commercial spent nuclear fuel is complex, expensive, and subject to discharge of radioactive gases into the environment. Reprocessing methodologies currently include the following main steps (batch and semi-continuous):

(i) chopping of the fuel bundles;
(ii) loading of the chopped pieces into a concentrated nitric acid dissolver;
(iii) prolonged acid digestion/dissolution and off-gas treatment;
(iv) removal of the metallic cladding and hardware pieces;
(v) filtering of the solution to remove undissolved solids;
(vi) multiple solvent extractions of the acid solution using a series of extractants; and
(vii) drying/calcinations of the separated products, acid recovery, and conversion of the remaining solution containing the fission products and minor actinide elements to a vitrified waste form.

The major challenges with existing reprocessing technology are the complexity and environmental risks; therefore, there is substantial room for improvement over the current state of the art.

SUMMARY OF THE INVENTION

A method for reprocessing spent nuclear fuel from a light water reactor includes the steps of:

reacting spent nuclear fuel in a voloxidation vessel with an oxidizing gas comprising nitrogen dioxide and oxygen for a period sufficient to generate a solid oxidation product of the spent nuclear fuel, wherein the reacting step comprises:

reacting, in a first zone of the voloxidation vessel, spent nuclear fuel with the oxidizing gas at a temperature ranging from 200-450° C. to form an oxidized reaction product, and regenerating nitrogen dioxide, in a second zone of the voloxidation vessel, by reacting oxidizing gas comprising nitrogen monoxide and oxygen at a temperature ranging from 0-80° C., wherein the first zone and the second zone are separate.

The method can further include the step of nitrating oxidized spent nuclear fuel, in a second zone of said voloxidation vessel, using the oxidizing gas comprising nitrogen dioxide at a temperature range from 0-80° C. to nitrate the fuel. The oxidizing gas can further include at least one selected from the group consisting of oxygen and water vapor.

The method can also include recovering at least one volatized constituent released from the spent nuclear fuel. The at least one volatized constituent can be selected from the group consisting of tritium, carbon dioxide, xenon, krypton, molecular iodine, and combinations thereof.

The method can further include maintaining a pressure in the voloxidation vessel at 5 atmospheres or less. The method can also include adding oxygen to the oxidizing gas. The ratio of nitrogen dioxide to oxygen in the oxidizing gas can be between 50:50 and 95:5.

The voloxidation vessel can be elongated. The first zone can be at a first end portion of the voloxidation vessel and the second zone can be at a second end portion of the voloxidation vessel opposite the first end portion. The spent nuclear fuel can be introduced into the voloxidation vessel at the first end portion and the oxidizing gas can be introduced into the voloxidation vessel at the second end portion.

The reacting step can continue for a duration sufficient for the solid oxidation product to comprise a finely divided powder.

The method can further include dissolving the solid oxidation product in an aqueous acid having a molar concentration ranging from 0.25 to 7 M. The dissolving step can be conducted at a temperature ranging from 10 to 100° C.

The nitration of the solid oxidation product can be accomplished by contacting the solid oxidation product with a nitration gas comprising nitrogen dioxide to produce a nitration product. The nitration gas can be pure nitrogen dioxide gas. The nitration product can be dissolved in a solvent. The nitration product can comprise technetium fission products which do not dissolve in the solvent.

A voloxidation system includes an elongated voloxidation vessel having a first zone and a second zone separate from the first zone. A feed system is coupled to a first end portion of the elongated voloxidation vessel for feeding spent nuclear fuel to the first zone. A gas handling system is coupled to a second end portion of the elongated voloxidation vessel and coupled to a first end portion of the elongated voloxidation vessel. A control system includes a processor and computer executable instructions for maintaining the first zone at a temperature ranging from 200-450° C., for maintaining the second zone at a temperature ranging from 0-80° C., or both.

The control system can include computer executable instructions for maintaining the first zone at a temperature ranging from 200-450° C. and for maintaining the second zone at a temperature ranging from 0-80° C.

The voloxidation system can further include a control system having a processor and computer executable instructions for maintaining a pressure in the voloxidation vessel at 5 atmospheres or less.

The gas handling system can include a trap for recovering at least one volatized constituent from the oxidizing gas, at least one condenser for recovering at least one volatized constituent from said oxidizing gas, and at least one selective membrane filter for recovering at least one volatized constituent from the oxidizing gas, or a combination thereof. The at least one volatized constituent can be a volatized fission product.

The voloxidation system can also include an oxygen supply system operably coupled to the elongated voloxidation vessel, the gas handling system, or both. The oxygen supply system adds oxygen to the voloxidation system.

BRIEF DESCRIPTION OF THE DRAWINGS

A better understanding of the present invention and the features and benefits thereof will be obtained upon review of the following detailed description together with the accompanying drawings, in which:

FIG. 1 shows a schematic diagram of a voloxidation system according to the invention, including an off-gas treatment system.

For a better understanding of the present invention, together with other and further objects, advantages and capabilities thereof, reference is made to the following disclosure and appended claims in connection with the above-described drawings.

DETAILED DESCRIPTION OF THE INVENTION

A voloxidation system and method of using the same for advanced dry head-end reprocessing of spent nuclear fuel from a light water reactor are disclosed. The system and methods disclosed herein are a substantial improvement over previous techniques because they:

(1) enhance the dry pyrochemical isolation of potential radioactive environmental pollutants, which include, but are not limited to, tritium, radioiodine, and technetium;

(2) simplify the off-gas trapping system;

(3) eliminate the prolonged dissolution step;

(4) reduce the amount of acid and the number of process steps needed for the solvent extraction; and (5) reduce the amount of raffinate waste solution generated. All of these advantages enable major cost reductions.

Moreover, these benefits are achieved while reducing the number of reprocessing steps, the necessary energy required for reprocessing, and the potential for discharge of radioactive compounds to the environment.

In one embodiment, a method for reprocessing spent nuclear fuel from a light water reactor is disclosed. As shown in FIG. 1, the method can include reacting spent nuclear fuel 26 in a voloxidation vessel 12 with an oxidizing gas comprising nitrogen dioxide and oxygen for a period sufficient to generate a solid oxidation product 30 from the spent nuclear fuel 26. The reacting step can include reacting spent nuclear fuel 26 with the oxidizing gas 28 at a temperature ranging from 200-450° C. in a first zone 14 of the voloxidation vessel 12. Nitrogen dioxide will be regenerated by reacting recycled oxidizing gas 44 comprising nitrogen monoxide and residual oxygen with make-up oxygen at a temperature ranging from 0-80° C. in the off-gas treatment system 33. Additional reactions to nitrate the spent nuclear fuel 26 with the oxidizing gas 28 at temperature ranging from 0-80° C., may take place in a second zone 16 of the voloxidation vessel 12. The first zone 14 and the second zone 16 are separate.

The temperature range in the first zone 14 can range from 225-400° C., or 250-350° C. or 250-300° C. The temperature range in the second zone 16 can range from 5-75° C., or 10-50° C., or 15-40° C.

As used herein, "spent nuclear fuel" refers to the remains of fissile compositions that have been used to fuel a nuclear reactor, such as a light water nuclear reactor, or other similar compositions. Spent clear fuel can include uranium oxides, plutonium oxides, or both, and a wide range of fission products that include, but are not limited to, molecular iodine (radioiodine), tritium, transuranium actinides, technetium, krypton and xenon.

As used herein, "solid oxidation product" refers to oxidation products of the spent clear fuel. For example, as discussed below, at appropriate temperature and pressure conditions, uranium (VI) oxide ($UO_3$) is a solid oxidation product resulting from the reaction of nitrogen dioxide and oxygen with spent nuclear fuel that includes uranium (IV) oxide ($UO_2$).

As used herein, "oxidizing gas" refers to a gas containing a gaseous constituent that can oxidize compounds present in spent nuclear fuel. Additional non-oxidizing gaseous constituents, such as reduction products of the oxidizing gas, may or may not be present. For example, as discussed below, nitrogen monoxide results from the reaction of an oxidizing gas containing nitrogen dioxide with spent nuclear fuel containing uranium. (IV) oxide ($UO_2$) at appropriate temperature and pressure conditions. An exemplary oxidizing gas can include nitrogen dioxide, nitrogen monoxide, and oxygen. In general, oxidizing gas 28 and recycled oxidation gas 44 can also include volatile fission products released from the spent nuclear fuel.

The method can also include recovering at least one volatized constituent released from the spent nuclear fuel. The at least one volatized constituent may include but is not limited to carbon dioxide, xenon, krypton, molecular iodine, and combinations thereof. The recovery can be from the recycle stream 44 and can be facilitated by one or more gas trapping, selective membrane filtering, or condensation techniques.

The method can include maintaining the pressure in the voloxidation vessel 12 at 5 atmospheres or less, or 3 atmospheres or less, or 2 atmospheres or less, or less than one atmosphere. In contrast to conventional reprocessing techniques, the voloxidation techniques disclosed do not require high pressures (e.g., 10 to 30 atmospheres) in order to facilitate reprocessing. The ability to voloxidize at such low pressures and temperatures enhances containment of potential radioactive environmental hazards, e.g., tritium, technetium, and radioiodine. For example, the voloxidation vessel can be operated below atmospheric pressure, which creates a negative pressure gradient with the surrounding environment and enhances containment of volatized fission products.

The oxidizing gas can have a nitrogen dioxide to oxygen ratio ranging from 50:50 to 95:5, or ranging from 60:40 to 90:10. Oxygen can be used to regenerate nitrogen dioxide that was reduced to nitrogen monoxide during oxidation of the spent nuclear fuel. The method can include adding oxygen to the oxidizing gas in order to achieve the proper nitrogen dioxide to oxygen ratio and replenish the oxygen consumed during oxidation of the spent nuclear fuel.

As shown in FIG. 1, a voloxidation system 10 is disclosed that can include an elongated voloxidation vessel 12 having a first zone 14 and a second zone 16 separate from the first zone 14. A feed system 18 can be coupled to a first end portion 20 of the elongated voloxidation vessel 12 for feeding spent nuclear fuel (SNF) to the first zone 14. A gas handling system 22 can be (i) coupled to a second end portion 24 of the elongated voloxidation vessel 12 for feeding an oxidizing gas 28 to the second zone 16, and (ii) coupled to a first end portion 20 of the elongated voloxidation vessel 12 for removing the oxidizing gas 28 in a recycle stream 44.

In an alternate embodiment (not shown), the gas handling system 22 can be (i) coupled to a second end portion 24 of the elongated voloxidation vessel 12 for removing oxidizing gas 28 in a recycle stream 44, and (ii) coupled to a first end portion 20 of the elongated voloxidation vessel 12 for feeding an oxidizing gas 28 from the recycle stream 44 to the first zone 14. Similarly, in an alternate embodiment (not shown), the spent nuclear fuel 26 can be fed into the second end portion 24 and then removed from the first end portion 20 after passing through the first zone 14.

As used herein, "end portion" refers to a portion of an object extending from an end of the object to a point on the same half of the major axis of the object. For example, the end portion can be the 49% (by length) of an object closest to an end of the object, or the 40% (by length) closest to an end of the object, or the 33% (by length) closest to an end of the object.

The spent nuclear fuel 26 can be introduced into the voloxidation vessel 12 at the first end portion 20 and the oxidizing gas 28 can be introduced into the voloxidation vessel 12 at the second end portion 24. The arrangement shown in FIG. 1 enables the hot solids from the first zone 14 to be cooled in the second zone 16, and enables at least partial nitration of spent nuclear fuel with the oxidizing gas 28 in the second zone 16 at temperatures of 0-80° C.

The reacting step can continue for a duration sufficient to oxidize the spent nuclear fuel 26 and form a solid oxidation product 30 that includes a finely divided powder. Once the reacted spent nuclear fuel exits the voloxidation vessel, the solid oxidation product 30 can be separated from the fuel clad 32. During the reacting step of the voloxidation process, the following reactions are believed to take place:

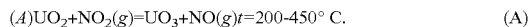

(A)$UO_2+NO_2(g)=UO_3+NO(g)$ $t=200\text{-}450°$ C.     (A)

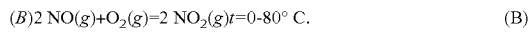

(B)$2\ NO(g)+O_2(g)=2\ NO_2(g)$ $t=0\text{-}80°$ C.     (B)

As shown in FIG. 1, the reactions can occur in a continuous apparatus containing a hot zone (first zone 14) for reaction (A) and a cold zone (second zone 16) for reaction (B). Overall the process is autocatalytic with gaseous $NO_2$ recycled while oxygen is consumed.

During oxidation reaction (A), $UO_2$ (which represents ~95% of uranium-based spent nuclear fuel) is oxidized to $UO_3$, and the spent nuclear fuel is transformed from a monolithic ceramic state into a solid oxidation product, predominated by a finely divided red powder.

After the used oxidation gas 28 is removed from the voloxidation vessel 12, it is processed and recycled through a gas handling system 33 prior to being reintroduced into the second end portion 16 of the voloxidation vessel 12. The gas handling system 33 can include a trap 34, 38, 40, 42 for recovering at least one volatized constituent from the oxidizing gas 28 in the recycle stream 44, at least one condenser 46 for recovering at least one volatized constituent from the oxidizing gas 28 in the recycle stream 44, or both. The at least one volatized constituent can be a volatized fission product. In addition, the voloxidation system 10 can include an oxygen supply system 52 operably coupled to the elongated voloxidation vessel 12, the gas handling system 33, or both 12, 33, for adding oxygen to the voloxidation system 10.

The gas handling system 33 is designed to process the recycle stream 44, which includes the used oxidation gas and volatized fission products. The hydrogen contained in the spent nuclear fuel 26, including the tritium, is released mostly as water vapor that can be trapped from the recycle stream 44 using suitable structure and methods such as a molecular sieve adsorbent bed 34. A catalyst such as a heated copper-based catalyst 36 can be used ahead of the adsorbent bed 34 to ensure that all hydrogen is transformed into water vapor.

All of the fission product iodine, which is present in the spent nuclear fuel 26 in part as CsI, is released as molecular iodine ($I_2$) vapor that can be removed from the recycle stream 44 using suitable selective trapping materials 38 such as heated Ag-zeolite or molten alkaline hydroxides (e.g., NaOH, KOH) or a bed of heated copper-wool fibers. The reaction that liberates the molecular iodine from the spent nuclear fuel is believed to be:

$$2CsI+4NO_2(g)=2CsNO_3+2NO(g)+I_2(g).$$

Other volatile and semi-volatile fission products can be removed from the recycle stream 44 in varied amounts, including C and $^{14}C$ as $CO_2(g)$, and the noble gases. Xe and Kr (including $^{85}Kr$). The $CO_2$ can be trapped using an alkaline trapping material 40, and the noble gases can be trapped and separated using suitable structure and methods such as molecular sieves 42 under a thermal- or pressure-swing cycle or selective membrane separation. The recovered xenon gas is a valuable material that can be reused.

The gas handling system 33 can also include a condenser 46 for removing nitrogen dioxide (including both $NO_2$ and $N_2O_4$) from the recycle stream 44. The condensed nitrogen dioxide can then pass through an evaporator 48 before being reintroduced to the recycle stream 22 or 28. The gas handling system 33 can include a purge 50 for eliminating amounts of molecular nitrogen or other unnecessary gases that enter the voloxidation vessel 12 at the feed system 18 or at the point where the solid oxidation product 30 is removed from the voloxidation vessel 12. Finally, make up oxygen 52 can be added to the recycle stream 44 in order o generate the oxidation gas 28 that is reintroduced at the second end portion 16 of the voloxidation vessel 12.

As indicated above, the voloxidation process can be conducted in a continuous process where the fission gases, and volatile plus semi-volatile fission products are trapped, and $NO_2(g)$ is recycled from the recycle stream 44. Of particular interest, the radioactive components are trapped with minimal risk that such components will be accidentally released into the atmosphere or introduced to solvents in downstream processes in the plant. For example, in conventional dissolution techniques, radioactive iodine and technetium are present in each solvent process requiring costly treatments. In the method disclosed herein, the iodine is completely removed and trapped using gas trapping techniques and the technetium remains in a solid form throughout so that the iodine and technetium are not transported into the solvent extraction system. These features reduce the need for secondary treatment of reprocessing solvents and limit the potential for accidental releases of radioactive contaminants to the environment.

The spent nuclear fuel 26 can be chopped in a shearing process 54 and then introduced into the voloxidation vessel 12. An exemplary method of feeding the chopped, spent nuclear fuel 26 includes using a screw feeder at one end of a cylindrical voloxidation vessel 12. The voloxidation vessel 12 can be a modified rotary calciner, where the rotary action can advance the spent nuclear fuel 26 from a first end 20 to a second end 24 of the voloxidation vessel 12. The residence time in the voloxidation vessel 12 can be from 1 to 5 hours, or from 2 to 4 hours. The solid oxidation product 30 can be removed from the second end 24 of the voloxidation vessel 12 using a discharge screw feeder. The solid oxidation product 30, including the finely divided powder, can be separated from the metallic cladding and hardware pieces 32.

Following voloxidation, the solid oxidation product 30 can be dissolved in an aqueous acid (e.g. nitric, hydrochloric, sulfuric, acetic, etc.) having a molar concentration ranging from 0.1 to 7 M. The molar concentration of the aqueous acid can be 5M or less, 2.5M or less, or 1M or less, and can be 0.15M or greater, 0.2M or greater, or 0.25M or greater. The dissolving step can be conducted at a temperature ranging from 5-100° C., or 10-75° C., or 15-50° C., or 20-40° C. Alternatively, the oxidation product can be dissolved in 0.25 to 3M aqueous carbonate solution (e.g. ammonium carbonate).

Alternately, following voloxidation, the solid oxidation product can undergo a nitration step. Although the nitration step can be separate from the voloxidation step, the nitration step can include contacting the solid oxidation product 30, or the spent nuclear fuel 26 in the second zone 16 of the voloxidizer 12, with a nitration gas comprising nitrogen dioxide for a period sufficient to produce a nitration product. The nitration gas can be pure nitrogen dioxide gas and oxygen gas or nitrogen dioxide gas and oxygen gas with water vapor at concentrations up to saturation. Where nitration occurs in the voloxidation vessel 12, the nitration gas can also be the oxidation gas 28 or the used oxidation gas 44.

The fine red powder (i.e., solid oxidation product 30 of the spent nuclear fuel 26 in the second zone 16 of the voloxidation vessel 12) produced during voloxidation, can contain uranium, transuranium actinides (TRUs), and non-volatile fission product oxides. The fine red powder 30, or the spent nuclear fuel 26 in the second zone 16 of the voloxidizer 12, can be cooled to near room temperature (e.g., 10-50° C.) and then treated with pure $NO_2$ ($N_2O_4$) gas to produce yellow metal nitrate powders. The solid oxidation product 30 can be separated from the clad 32 after both are removed from the voloxidation vessel 12.

As shown below, a typical reaction results in the production of a nitration product, such as a uranyl nitrate:

$$UO_3 + 5NO_2(g) = UO_2(NO_3)_3NO + NO(g)$$

The nitration product can also include nitrated products of Pu, Np, Am, and Cm, as well as, non-volatile fission products. The alkali, alkaline earth, and transition metal fission products form nitrates. The rare earth fission products become nitrates or nitrosyl nitrates. Certain noble metal fission products, such as technetium, are not nitrated.

Following the nitration step, the nitration product can be dissolved in a solvent. The solvent can be selected so that nitrated species in the nitration product can be solubilized while potential contaminants, such as technetium fission products, are not dissolved. The solvent used for the dissolving step can include, for example, aqueous carbonate solutions, water or tributyl phosphate (TBP), or can consist essentially of water or tributyl phosphate. Other solvents could include TBP, malonomides, or solutions of these extractants in paraffinic or aromatic hydrocarbons.

The nitrated components of the nitration products can be directly dissolved in the organic solvent TBP. Studies at the Oak Ridge National Laboratory (ORNL) using fuel from the Dresden reactor showed that all actinides (U, Pu, Np, Am, and Cm) can undergo nitration and then be dissolved and extracted into a TBP solvent, along with some fission products.

In this process, technetium fission products are insoluble and are not extracted. This provides an additional advantage over the standard industrial $HNO_3$ acid leaching/dissolution process, in which a large fraction of the technetium is dissolved with uranium and then follows the uranium stream through the subsequent separation processes. Thus, additional steps of purification are required to separate the undesirable technetium from the uranium. If even minute amounts of technetium remains in the uranium product stream, the technetium impurity can complicate the succeeding uranium re-enrichment process that is necessary for recycling uranium as reactor fuel. This substantial complication is eliminated using the process described above.

The voloxidation system 10 can also include a control system 6 that includes a processor and computer executable instructions for maintaining the first zone 14 at a temperature ranging from 200-450° C., for maintaining the second zone 16 at a temperature ranging from 0-80° C., or both. The control system 56 can also include computer executable instructions for maintaining a pressure in the voloxidation vessel 12 at 5 atmospheres or less. The control system 56 can include computer executable instructions for controlling any and all process steps disclosed herein, including all aspects related to feeding and removal of all spent nuclear fuel (and reaction products thereof) and gases passing through the voloxidation vessel 12.

While there has been shown and described what are at present considered the preferred embodiments of the invention, it will be obvious to those skilled in the art that various changes and modifications can be prepared therein without departing from the scope of the inventions defined by the appended claims.

We claim:

1. A method for reprocessing spent nuclear fuel from a light water reactor, comprising:
    maintaining a first end portion of an elongated voloxidation vessel at a first temperature ranging from 200-450° C.;
    maintaining a second end portion of the elongated voloxidation vessel at a second temperature ranging from 0-80° C., wherein the second end portion is opposite the first end portion;
    introducing spent nuclear fuel into the first end portion;
    introducing an oxidizing gas comprising nitrogen dioxide and oxygen into the second end portion;
    reacting spent nuclear fuel and the oxidizing gas in the first end portion at the first temperature to generate a solid oxidation product; and
    reacting nitrogen monoxide and oxygen in the second end portion at the second temperature to regenerate nitrogen dioxide.

2. The method according to claim 1, further comprising: nitrating the solid oxidation product, in the second end portion, using said oxidizing gas at the second temperature.

3. The method according to claim 2, wherein said oxidizing gas further comprises water vapor.

4. The method according to claim 1, further comprising, recovering at least one volatized constituent released from the spent nuclear fuel, wherein said at least one volatized constituent is selected from the group consisting of tritium, carbon dioxide, xenon, krypton, molecular iodine, and combinations thereof.

5. The method according to claim 1, further comprising, maintaining a pressure in said elongated voloxidation vessel at 5 atmospheres or less.

6. The method according to claim 1, wherein a ratio of nitrogen dioxide to oxygen in said oxidizing gas is between 50:50 and 95:5.

7. The method according to claim 1, wherein the step of reacting spent nuclear fuel and the oxidizing gas in the first end portion continues for a duration sufficient for said solid oxidation product to comprise a finely divided powder.

8. The method according to claim 7, further comprising: dissolving said solid oxidation product in an aqueous acid having a molar concentration ranging from 0.25 to 7 M.

9. The method according to claim 8, wherein said dissolving step is conducted at a temperature ranging from 10 to 100° C.

10. The method according to claim 7, comprising:
nitrating said solid oxidation product by contacting said solid oxidation product with a nitration gas comprising nitrogen dioxide to produce a nitration product.

11. The method according to claim 10, wherein said nitration gas is pure nitrogen dioxide gas.

12. The method according to claim 10, further comprising:
dissolving said nitration product in a solvent.

13. The method according to claim 12, wherein said nitration product comprises technetium fission products and said technetium fission products do not dissolve in said solvent.

14. The method according to claim 1, wherein the first temperature ranges from 200-300° C.

15. The method according to claim 14, further comprising nitrating the solid oxidation product, in the second end portion, using the oxidizing gas at the second temperature to produce a uranyl nitrate.

* * * * *